(12) United States Patent
Yuan et al.

(10) Patent No.: US 12,726,300 B2
(45) Date of Patent: Sep. 1, 2026

(54) UE COOPERATION IN TRANSMISSION AND RECEPTION

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Aleksandar Damnjanovic, Del Mar, CA (US); Yitao Chen, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/008,898

(22) PCT Filed: Jul. 30, 2020

(86) PCT No.: PCT/CN2020/105854
§ 371 (c)(1),
(2) Date: Dec. 7, 2022

(87) PCT Pub. No.: WO2022/021221
PCT Pub. Date: Feb. 3, 2022

(65) Prior Publication Data

US 2023/0224108 A1 Jul. 13, 2023

(51) Int. Cl.
*H04L 5/00* (2006.01)

(52) U.S. Cl.
CPC .......... *H04L 5/0037* (2013.01); *H04L 5/0016* (2013.01); *H04L 5/0051* (2013.01)

(58) Field of Classification Search
USPC .......................................................... 370/330
See application file for complete search history.

(56) References Cited

U.S. PATENT DOCUMENTS

| | | | |
|---|---|---|---|
| 10,666,330 B2 * | 5/2020 | Nammi | H04L 25/03929 |
| 2016/0036542 A1 | 2/2016 | Gong et al. | |
| 2017/0013599 A1 * | 1/2017 | Sun | H04L 5/0053 |

(Continued)

FOREIGN PATENT DOCUMENTS

| | | |
|---|---|---|
| CN | 102308489 A | 1/2012 |
| CN | 104105120 A | 10/2014 |

(Continued)

OTHER PUBLICATIONS

Qualcomm et al. WF on CW to layer mapping scheme for CP-OFDM data channels, 3GPP R1-1714664 (Year: 2017).*

(Continued)

*Primary Examiner* — Luna Weissberger
(74) *Attorney, Agent, or Firm* — Procopio, Cory, Hargreaves & Savitch LLP

(57) ABSTRACT

A configuration to configure a UE to utilize a layer mapping configuration for mapping coded data. The apparatus applies a layer mapping order for mapping coded data in time, frequency, and a plurality of spatial layers for a plurality of UEs configured in cooperation or a plurality of panels configured in cooperation. The apparatus exchanges the coded data with a base station based on the layer mapping order.

27 Claims, 13 Drawing Sheets

(56) References Cited

U.S. PATENT DOCUMENTS

| | | | | |
|---|---|---|---|---|
| 2019/0319759 | A1 | 10/2019 | Harrison et al. | |
| 2020/0107353 | A1* | 4/2020 | Jung | H04W 72/23 |
| 2020/0187205 | A1 | 6/2020 | Kakishima et al. | |
| 2020/0220592 | A1 | 7/2020 | Ryu et al. | |
| 2020/0336181 | A1* | 10/2020 | Cao | H04B 7/0626 |
| 2020/0359371 | A1* | 11/2020 | Takeda | H04L 1/1812 |
| 2021/0112538 | A1* | 4/2021 | Kim | H04L 1/04 |

FOREIGN PATENT DOCUMENTS

| | | | | |
|---|---|---|---|---|
| CN | 106712915 | A | 5/2017 | |
| CN | 107623541 | A | 1/2018 | |
| CN | 109417531 | A | 3/2019 | |
| CN | 110582962 | A | 12/2019 | |
| CN | 110999181 | A | 4/2020 | |
| CN | 111357349 | A | 6/2020 | |
| EP | 3474615 | A1 | 4/2019 | |
| WO | 2018204333 | A1 | 11/2018 | |
| WO | 2018204601 | A1 | 11/2018 | |
| WO | WO-2018229078 | A1 * | 12/2018 | H04B 7/0697 |
| WO | 2020039388 | A1 | 2/2020 | |
| WO | 2020056783 | A1 | 3/2020 | |
| WO | WO-2020073257 | A1 * | 4/2020 | H04L 5/00 |

OTHER PUBLICATIONS

Huawei, et al., "Other Issues on NR eMIMO in R16", 3GPP TSG RAN WG1 Meeting #98bis, R1-1910399, Chongqing, China, Oct. 14-20, 2019, 4 Pages, The Whole Document.

International Search Report and Written Opinion—PCT/CN2020/105854—ISA/EPO—Apr. 29, 2021.

Huawei, et al., "Codeword to Layer Mapping in NR", 3GPP TSG RAN WG1 Meeting #88bis, R1-1705073, 3rd Generation Partnership Project, Mobile Competence Centre, 650, Route Des Lucioles, F-06921 Sophia-Antipolis Cedex, France, vol. RAN WG1, No. Spokane, USA, Apr. 3, 2017-Apr. 7, 2017, Mar. 25, 2017, pp. 1-9, XP051251731, the whole document.

Lenovo, et al., "Discussion on UL Multi-panel Transmission", 3GPP TSG RAN WG1 Meeting #96bis, R1-1904574, Discussion on UL Transmission with Multi-TRP V2, 3rd Generation Partnership Project, Mobile Competence Centre, 650, Route Des Lucioles, F-06921 Sophia-Antipolis Cedex, vol. RAN WG1, No. Xi'an, China, Apr. 8, 2019-Apr. 12, 2019, Mar. 29, 2019, 8 Pages, XP051691609, the whole document.

Supplementary European Search Report—EP20946957—Search Authority—Munich—Mar. 25, 2024.

* cited by examiner

500

UE COOPERATION IN TRANSMISSION AND RECEPTION

CROSS REFERENCE TO RELATED APPLICATION(S)

This application is National Stage Application filed under 35 U.S.C. § 371 of PCT International Application No. PCT/CN2020/105854, entitled "UE COOPERATION IN TRANSMISSION AND RECEPTION" and filed Jul. 30, 2020, which is expressly incorporated by reference herein in its entirety.

BACKGROUND

Technical Field

The present disclosure relates generally to communication systems, and more particularly, to a configuration for uplink multiple input multiple output (MIMO).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus applies a layer mapping order for mapping coded data in time, frequency, and a plurality of spatial layers for a plurality of user equipments (UEs) configured in cooperation. The apparatus exchanges the coded data with a base station based on the layer mapping order.

In an aspect of the disclosure, a method, a computer-readable medium, and an apparatus are provided. The apparatus may be a device at a base station. The device may be a processor and/or a modem at a base station or the base station itself. The apparatus applies a layer mapping order for mapping coded data in time, frequency, and a plurality of spatial layers for a plurality of user equipments (UEs) configured in cooperation. The apparatus exchanges the coded data with the plurality of UEs based on the layer mapping order.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
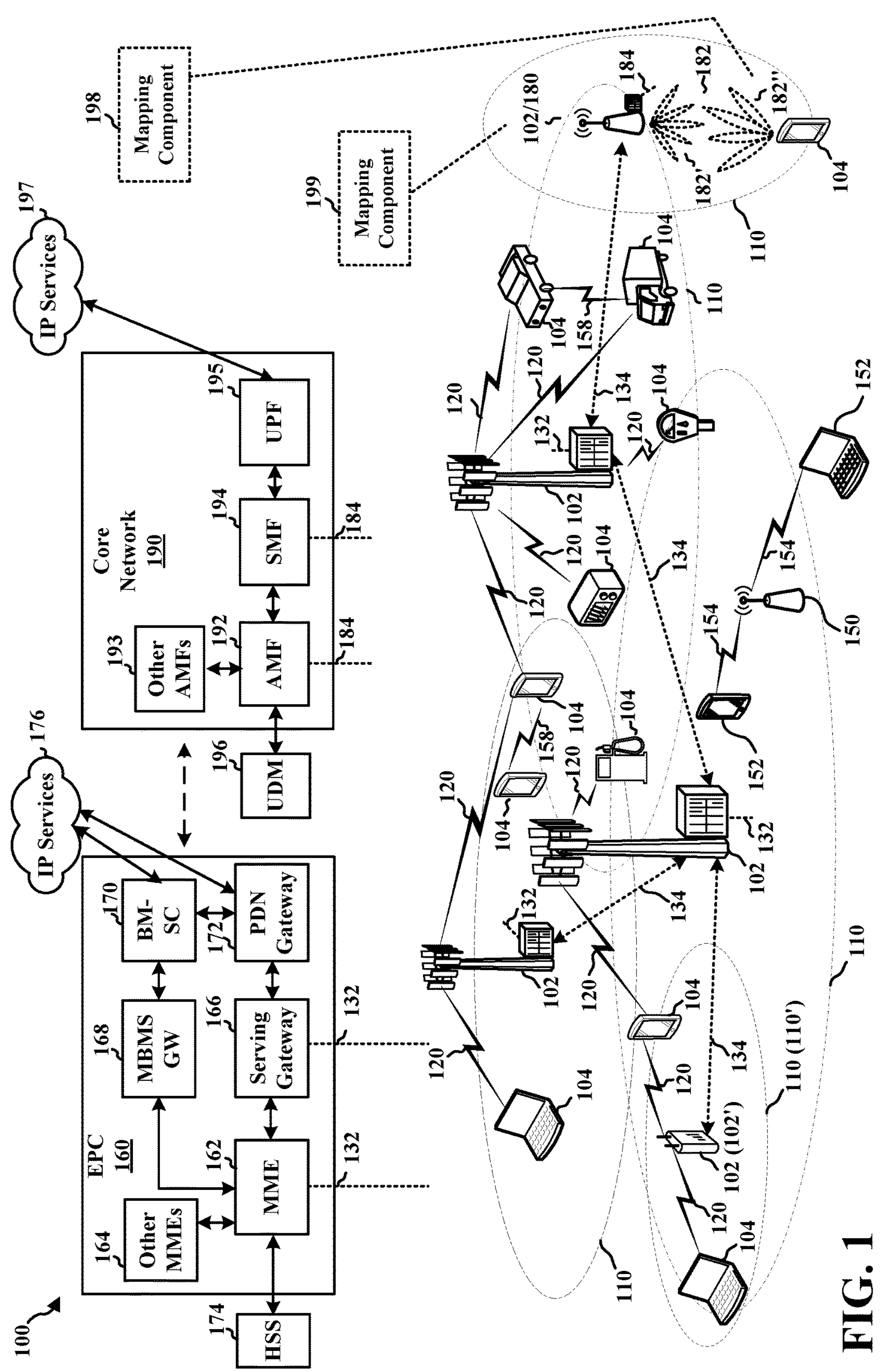
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to utilize a layer mapping configuration for mapping coded data. For example, the UE 104 may comprise a mapping component 198 configured to apply a layer mapping order. The UE 104 applies a layer mapping order for mapping coded data in time, frequency, and a plurality of spatial layers for a plurality of UEs configured in cooperation. The UE 104 exchanges the coded data with a base station based on the layer mapping order.

Referring again to FIG. 1, in certain aspects, the base station 180 may be configured to configure a UE to utilize a layer mapping configuration for mapping coded data. For example, the base station 180 may comprise a mapping component 199 configured to apply a layer mapping order. The base station 180 applies a layer mapping order for mapping coded data in time, frequency, and a plurality of spatial layers for a plurality of UEs configured in cooperation. The base station 180 exchanges the coded data with the plurality of UEs based on the layer mapping order.

Although the following description may be focused on 5G NR, the concepts described herein may be applicable to other similar areas, such as LTE, LTE-A, CDMA, GSM, and other wireless technologies.

Figures 2A, 2B, 2C, 2D:
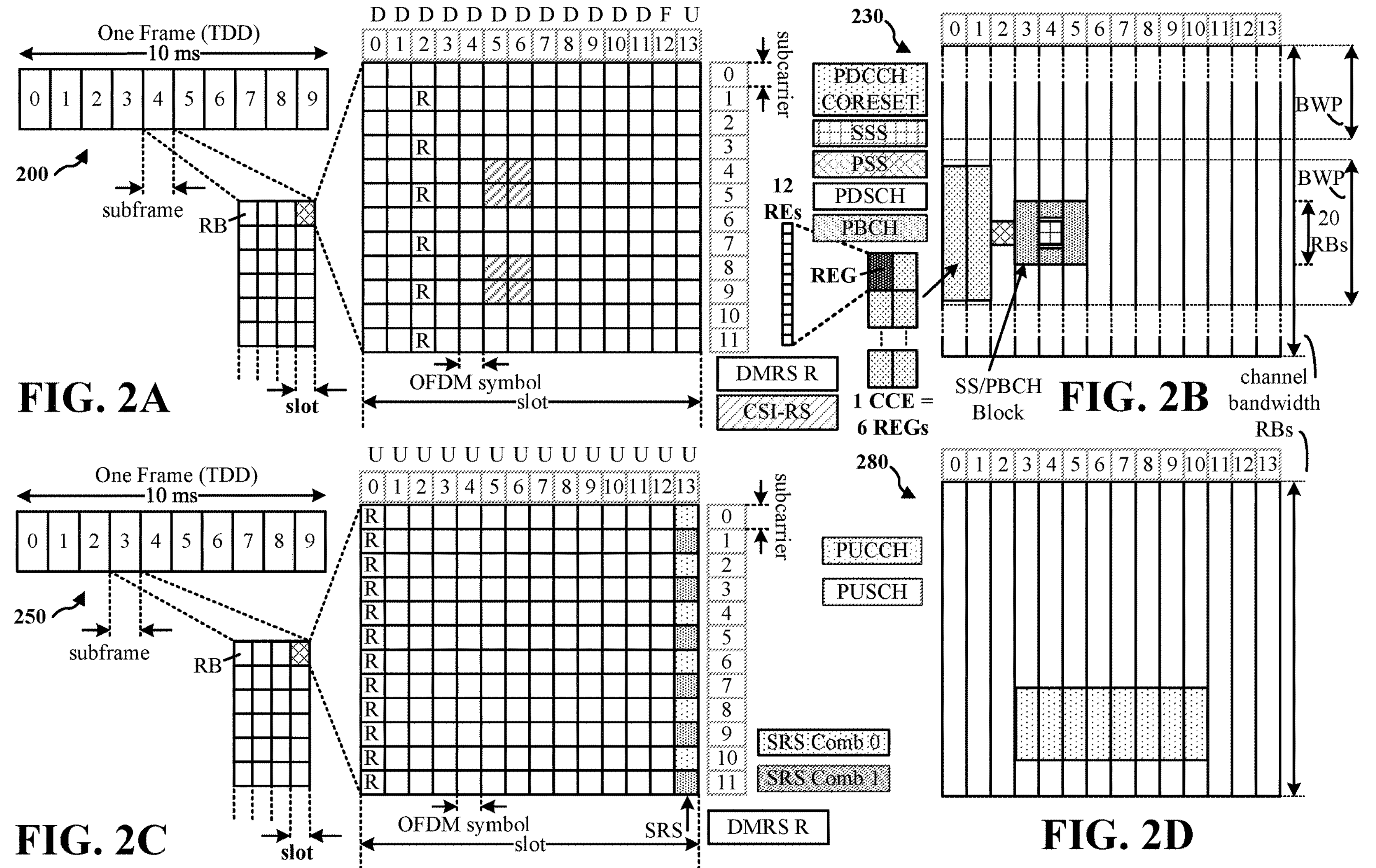
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
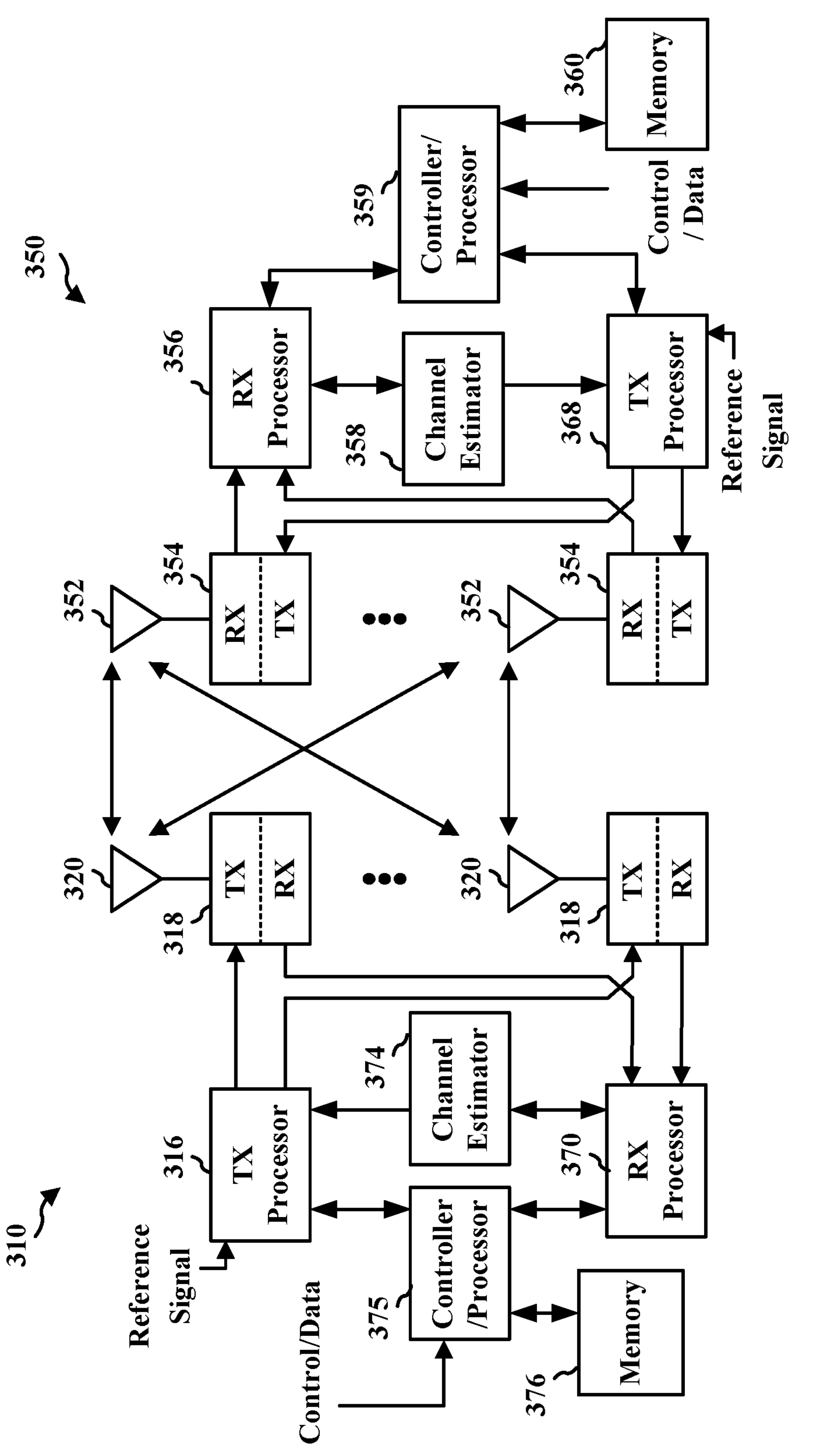
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
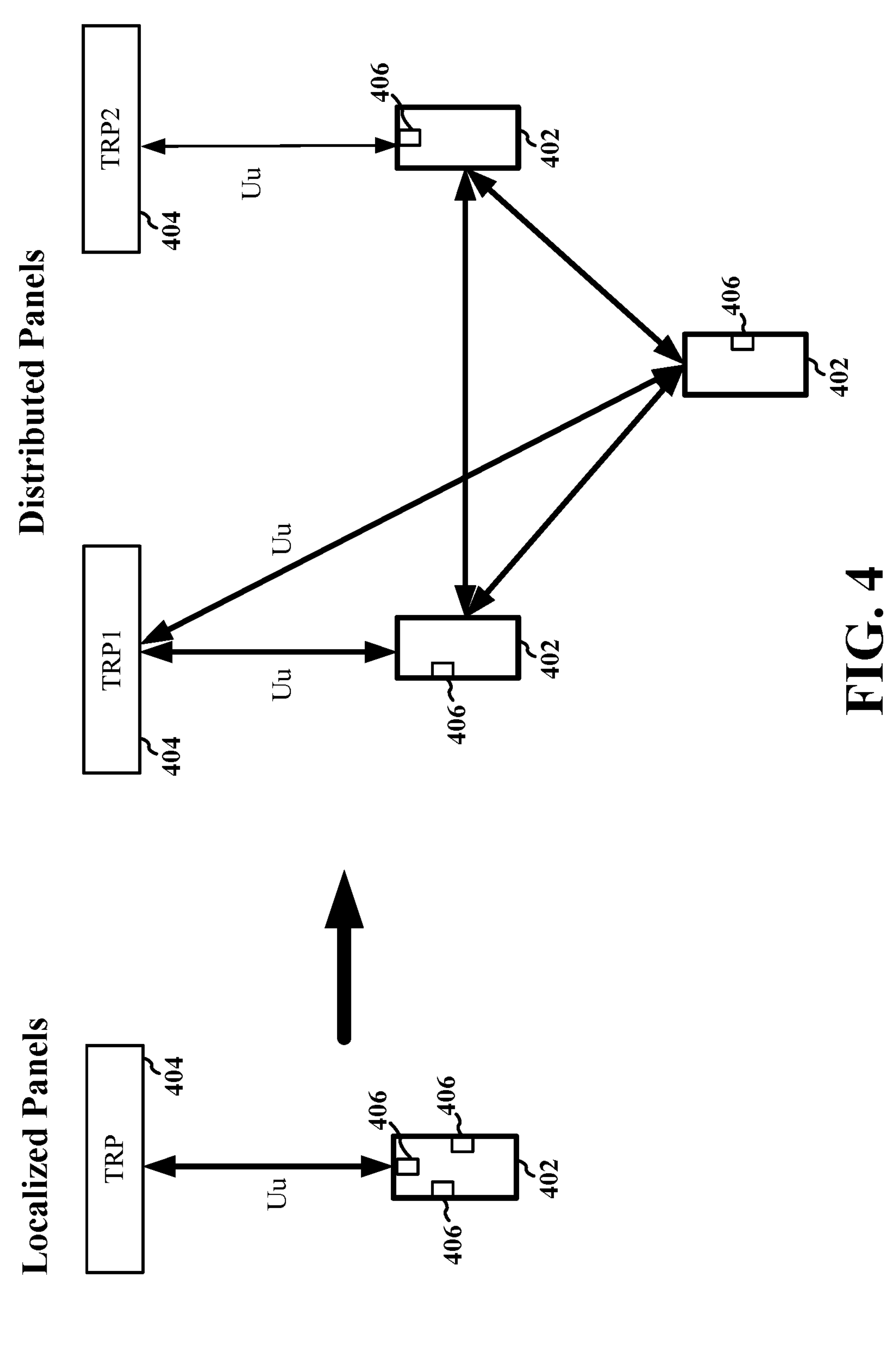
FIG. 4 is a diagram illustrating an example of wireless devices having localized panels or distributed panels.

FIG. 4 is a diagram 400 illustrating an example of wireless devices having localized panels or distributed panels. In some wireless communication systems, a UE 402 may comprise one or more antenna panels 406 and each panel may communicate with a base station 404. The UE having multiple antenna panels may be considered as having antenna panels co-located close to each other. This type of UE may be considered as having localized panels. These localized panels may be configured to support multi-panel uplink transmission to a base station 404.

Some wireless communication systems may support UEs having distributed panels, such that each distributed panel may communicate with the base station. For example, a group of UEs may each have one or more panel used for communication, and the UEs having the distributed panels may be configured in cooperation. A base station may exchange communication with the group of UEs, e.g., transmitting or receiving with one or more of the group of UEs. The UEs may exchange the communication received from the base station with the other UEs of the group. A UE 402 having distributed panels 406 may operate under two schemes. A first scheme may be configured such that a base station 404 may individually communicate with each distributed panel of each UE. In the first scheme, each panel may comprise a unique UE identifier (ID), where the cooperation is also referred as UE cooperation. The UE ID can be an explicit ID such as a radio network temporary identifier, or an implicit ID associated with a channel ID or reference signal ID. For example, any of the beam ID, the TCI state ID, the spatial relationship information ID, the SRS resource ID or SRS resource set ID can be used to identify a UE. In a second scheme, the base station may communicate with all of the distributed panels concurrently, wherein each panel may comprise a same UE ID but may also comprise a unique panel ID and the cooperation is also referred as panel cooperation. The panel ID can be an explicit panel ID, or an implicit ID associated with a channel ID or reference signal ID. For example, any of the beam ID, the close loop index in power control configuration, the TCI state ID, the spatial relationship information ID, the SRS resource ID or SRS resource set ID can be used to identify a panel. In some instances, the panel ID may be the same as the UE ID, while having distinct panel IDs and UE IDs than the other panels within the distributed panel configuration. The disclosure may be applied to, but not limited to, UE cooperation or panel application.

Figure 5:
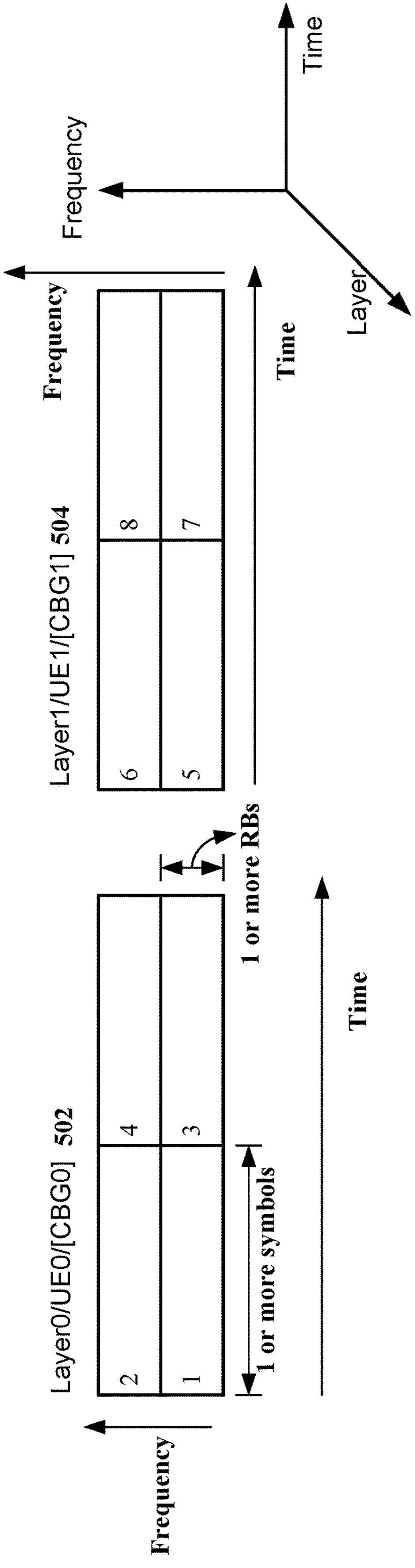
FIG. 5 is a diagram illustrating an example of layer mapping.

Aspects presented herein provide a mapping order for communication for distributed panels across multiple devices. FIG. 5 is a diagram 500 illustrating an example of layer mapping. The diagram 500 includes a Layer0 502 and a Layer1 504. The Layer0 502 may be associated with a UE (e.g., UE0), and the Layer1 504 may be associated with another UE (e.g., UE1). When a group of UEs are configured in cooperation, the layer mapping for a PDSCH or a PUSCH may be based on frequency, time, and spatial layers. The PDSCH or PUSCH may be for the group of UEs, which are configured in cooperation to receive/transmit as distributed panels, as described in connection with FIG. 4. The layer mapping order may map coded data to the frequency resources first, the time resources second, and the plurality of spatial layers third. Each spatial layer may be associated with at least one UE of the plurality of UEs. In addition, a DMRS port may be associated with a spatial layer. For example, after channel coding, a first portion of the coded data may be mapped into the resource denoted as "1" in FIG. 5. The next portion of the coded data is mapped to an adjacent frequency resource as shown with "2" If the two portions of the coded data fill the frequency resources for the transmission, the next portion of the coded data may be mapped to the adjacent time resource as shown with "3" followed by mapping in frequency shown with "4." "1," "2,"

"3," and "4," indicate an order of the mapping for the coded data in a manner of frequency-first and time-second for a given spatial layer. Once the mapping of the coded data fills the frequency and time resources for the transmission, the coded data may be mapped to a different spatial layer, e.g., layer 1, in a manner of frequency-first and time-second. The layers may be for a different UE of the group of UEs. The mapping order of "5," "6," "7," and "8" for spatial layer 1 show that the mapping for the layer is performed in a frequency first, time second manner. The coded data for "1" may be mapped to the same time and frequency resources as for "5" but for a different spatial layer. In this example, the mapping order may map to different spatial layers last. The unit of resource denoted by "1" to "8" can be any of resource element, resource block or resource block group as defined in 3GPP new radio specifications. The unit of resource denoted by "1" to "8" can span one OFDM symbol, or multiple OFDM symbols in a duration indicated by the DCI.

Figure 6:
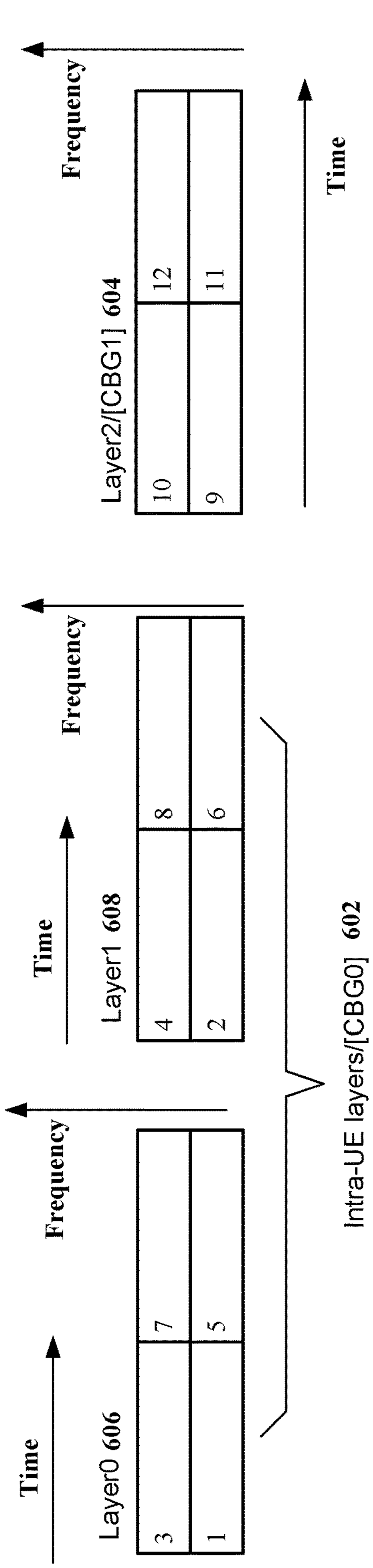
FIG. 6 is a diagram illustrating an example of layer mapping.

FIG. 6 is a diagram 600 illustrating another example of layer mapping. The diagram 600 includes a Layer0 606, a Layer1 608, and a Layer2 604. The diagram 600 also includes an intra-UE layer 602, which may comprise the Layer0 606 and the Layer1 608. When a group of UEs are configured in cooperation, the layer mapping for a PDSCH or a PUSCH may be based on spatial layers, frequency, and time. The PDSCH or PUSCH may be for a group of UEs that are configured in cooperation to receive/transmit as distributed panels. For example, the layer mapping order may map coded data for a single UE to a plurality of spatial layers first, the frequency second, and the time third. The, coded data may be mapped to a different spatial layer for a different UE. For example, the coded data mapped at 602 may be mapped to the same UE, which may be referred to as "intra-UE" mapping. In some aspects, the layer mapping order may map to a plurality of spatial layers for a first UE in the plurality of UEs prior to mapping to the frequency and the time for the first UE followed by mapping to an additional spatial layer for a second UE in the plurality of UEs. The coded data for "1" , "2" and "9" may be mapped to the same time and frequency resource on different spatial layers, for example.

Figure 7:
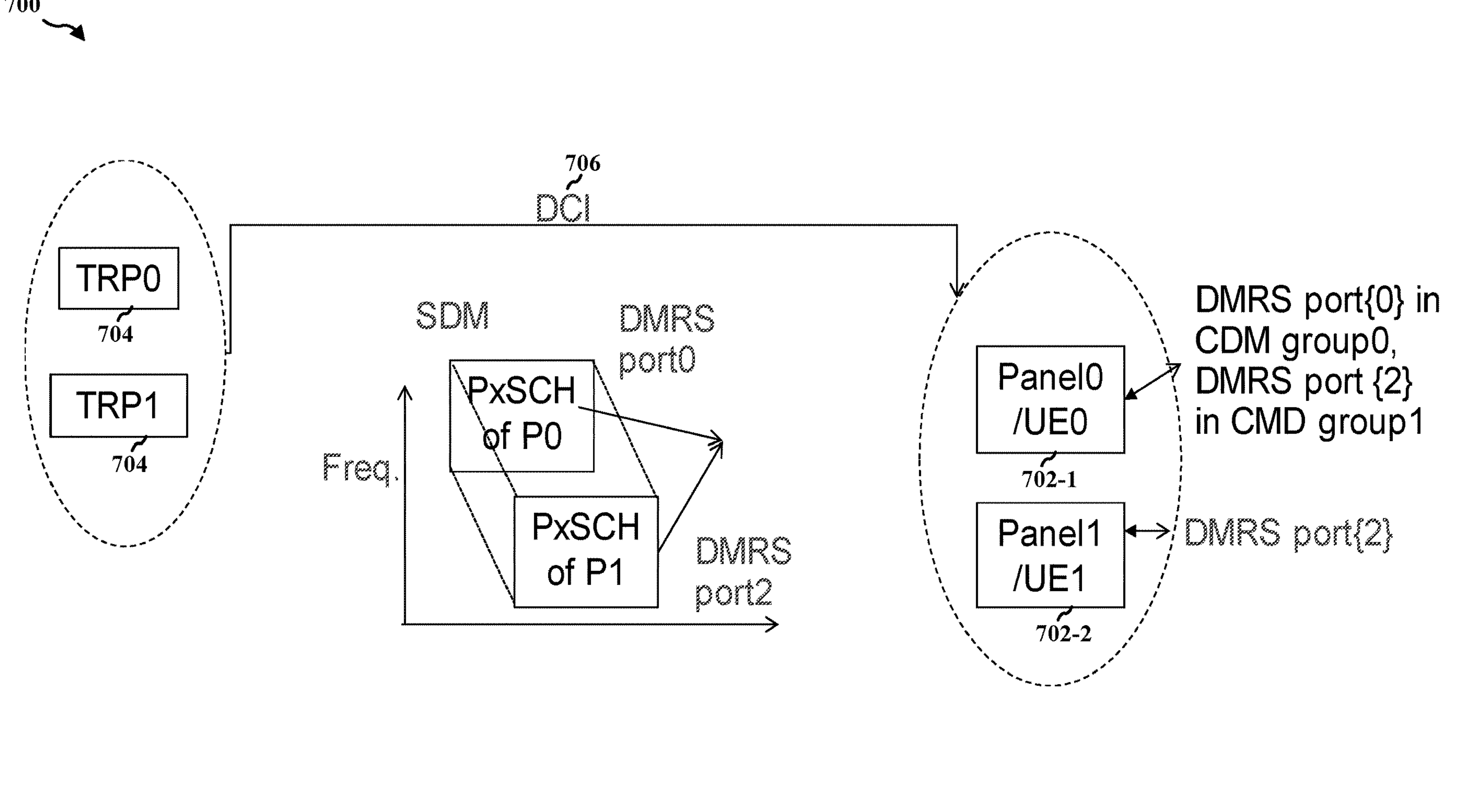
FIG. 7 is a diagram illustrating an example of interference suppression.

FIG. 7 is a diagram 700 illustrating an example of information that may be provided to a UE configured in cooperation with one or more additional UEs to assist the UE in performing interference suppression. When a group of UEs (e.g., 702-1, 702-2) are configured in cooperation, a UE (e.g., 702-1) may receive an indication with DMRS ports for the layer(s) specific to the UE 702-1. As presented herein, the UE may also receive an indication of the DMRS port(s) for the layers specific to other UEs (e.g., 702-2). For example, the UE may receive an indication of one or more DMRS ports for the other layers for which the UE is capable of performing interference suppression. In some aspects, the UE (e.g., 702-1) may receive an indication with two DMRS code division multiplex (CDM) groups. The DMRS ports in one CDM group may be applied with orthogonal cover codes (OCC). The DMRS ports in a first CDM group may be associated with the layers for the UE 702-1, while the DMRS ports in a second CDM group may be associated with the layer for the other UE (e.g., 702-2). The UE may determine the DMRS port for layer associated with the other UE based on the second CDM group. The UE may use the DMRS port information to perform interference measurements. In some aspects, the UE 702-1 may receive an indication with two DCIs 706. The DMRS ports in a first DCI may be associated with the layers for the UE 702-1, while the DMRS ports in a second DCI may be associated with the layers for the other UE (e.g., 702-2). The UE may determine the DMRS port for layer associated with the other UE based on the second DCI. The indication may be received in a DCI 706 from a first base station (e.g., TRP0 704). The UE 702-1 may be configured to measure interference from the other UE 702-2 by measuring the signal received at the DMRS port associated with the other UE 702-2. The UE may use the measured interference to perform interference suppression of the interference based on transmissions for the other UE that are received by the first UE.

Figure 8:
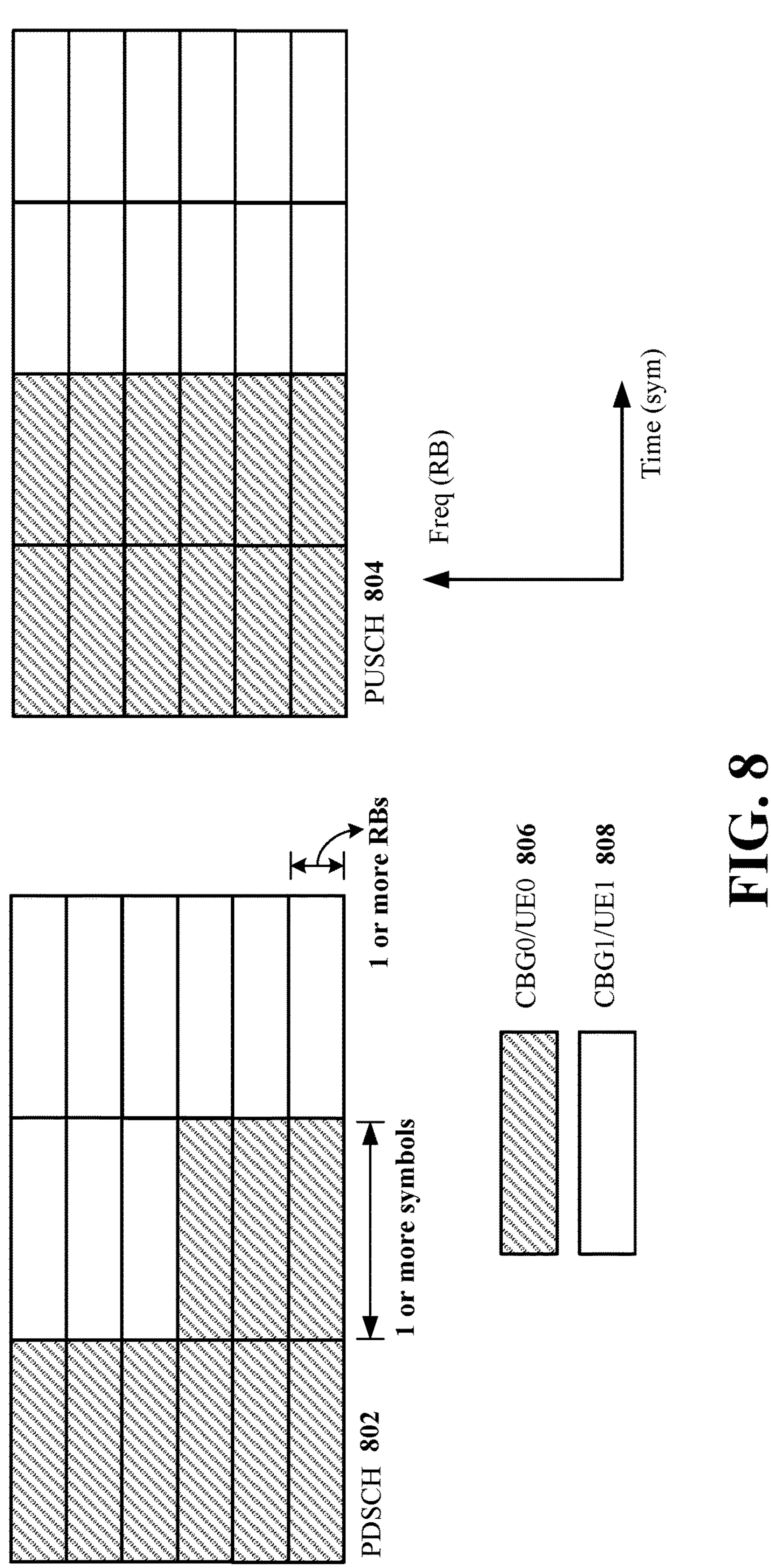
FIG. 8 is a diagram illustrating an example of resource mapping.

FIG. 8 is a diagram 800 illustrating an example of resource mapping for a PDSCH 802 and a PUSCH 804. A group of UEs may be configured in cooperation and configured to support multiple codeword (CW) or code block group (CBG) reception or transmission. Each UE in the group may be configured to receive an indication with a dedicated CW or CBG. For example, a CW or CBG may be associated with at most one UE. The data may be mapped in order to align the CW or CBG for different UEs in the resource mapping. In the diagram 800 of FIG. 8, the CBG0 806 may be associated with a first UE (e.g., UE0), and the CBG1 808 may be associated with a second UE (e.g., UE1). In some aspects, for PUSCH 804, the dedicated CW or CBG may map to all indicated RBs of an OFDM symbol. In some aspects, for PDSCH 802, the dedicated CW or CBG may map to all or part of the indicated RBs of an OFDM symbol.

Figure 9:
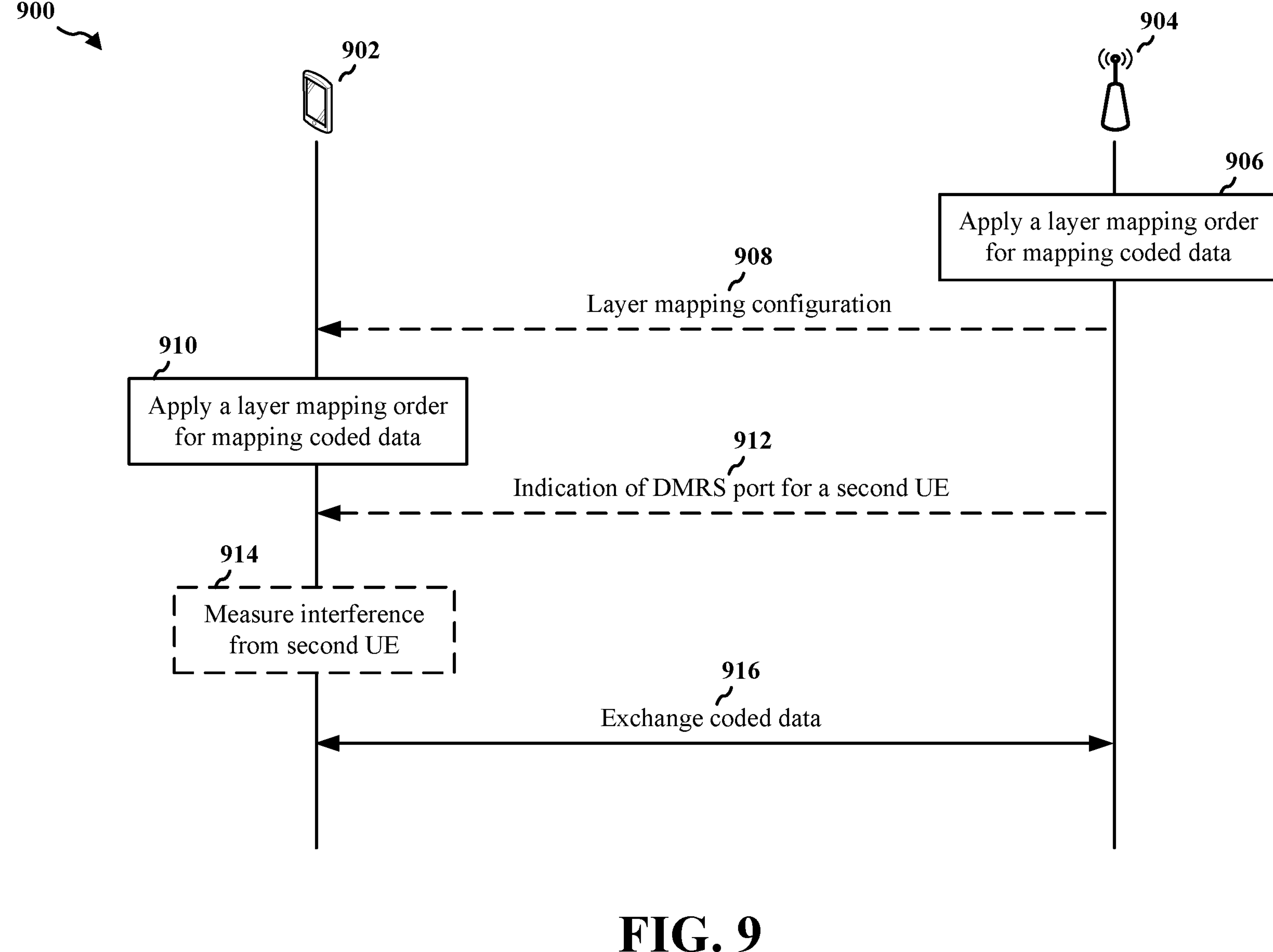
FIG. 9 is a call flow diagram of signaling between a UE and a base station in accordance with certain aspects of the disclosure.

FIG. 9 is a call flow diagram 900 of signaling between a UE 902 and a base station 904. The base station 904 may be configured to provide a cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350. Optional aspects are illustrated with a dashed line.

As illustrated at 906, the base station 904 may apply a layer mapping order. The base station 904 may apply the layer mapping order for mapping coded data. The layer mapping order for mapping coded data may be based in time, frequency, and a plurality of spatial layer for a plurality of UEs or a plurality of panels. The plurality of UEs or the plurality of panels may be configured in cooperation. FIG. 9 provides an example of a communication flow between a UE and base station. The UE may be one of multiple UEs configured in cooperation in some examples. In other examples, the aspects described in connection with UE 902 may be performed for a panel configured in cooperation with a plurality of panels to exchange communication with a base station.

In some aspects, as illustrated at 908, the base station 906 may transmit the layer mapping configuration to the UE 902. The UE 902 may receive the layer mapping configuration from the base station 904. The layer mapping configuration may indicate the layer mapping order.

In some aspects, as illustrated at 910, the UE 902 may apply the layer mapping order. In some aspects, the layer mapping order may map the coded data to the frequency first, the time second, and the plurality of spatial layers third. Each spatial layer of the plurality of spatial layers may be associated with at least one UE of the plurality of UEs or at least one panel of the plurality of panels. Each spatial layer of the plurality of spatial layers may be associated with a respective demodulation reference signal (DMRS) port. In some aspects, the layer mapping order may map the coded data to the plurality of spatial layers first, the frequency second, and the time third. The layer mapping order may map to a plurality of spatial layers for a first UE (e.g., 902) in the plurality of UEs prior to mapping to the frequency and the time for the first UE (e.g., 902) followed by mapping to an additional spatial layer for a second UE (not shown) in the plurality of UEs. In some aspects, each of the plurality of UEs may be associated with a codeword or a code block group. The layer mapping order may align a codeword or a code block group for a respective UE in the plurality of UEs. In some aspects, the first UE (e.g., 902) may be associated with a dedicated codeword or dedicated code block group. In some aspects, the coded data may be for a PUSCH and the coded data for the dedicated codeword or the dedicated code block group may map to each RB of an orthogonal frequency division multiplexing (OFDM) symbol for scheduled resources. In some aspects, the coded data may be for a PDSCH and the coded data for the dedicated codeword or the dedicated code block group corresponds to at least a portion of RBs of an OFDM symbol for scheduled resources.

In some aspects, as illustrated at 912, the base station 904 station may transmit an indication of a DMRS port for a second UE (not shown) in the plurality of UEs. The UE 902 may receive the indication of the DMRS port for the second UE. In some aspects, the indication may be comprised in a set of DMRS code division multiplex (CDM) groups. A first CDM group may correspond to a first DMRS port for the first UE (e.g., 9020 and a second CDM group may correspond to a second DMRS port for the second UE. In some aspects, the indication may be transmitted in DCI from the base station. A first DCI may indicate a first DMRS port for the first UE (e.g., 902) and a second DCI may indicate a second DMRS port for the second UE.

In some aspects, as illustrated at 914, the UE 902 may measure interference from the second UE (not shown). The UE 902 may measure interference from the second UE by measuring the signal received at the DMRS port associated with the second UE. The UE 902 measuring the signal received at the DMRS port associated with the second UE allows the UE 902 to suppress the interference from the second UE by adjusting its signal to account for the measured signal received at the DMRS port associated with the second UE.

As illustrated at 916, the UE 902 may exchange the coded data with a base station 904. The UE 902 may exchange the coded data with the base station 904 based on the layer mapping order. The base station 904 may exchange the coded data with the plurality of UEs based on the layer mapping order.

Figure 10:
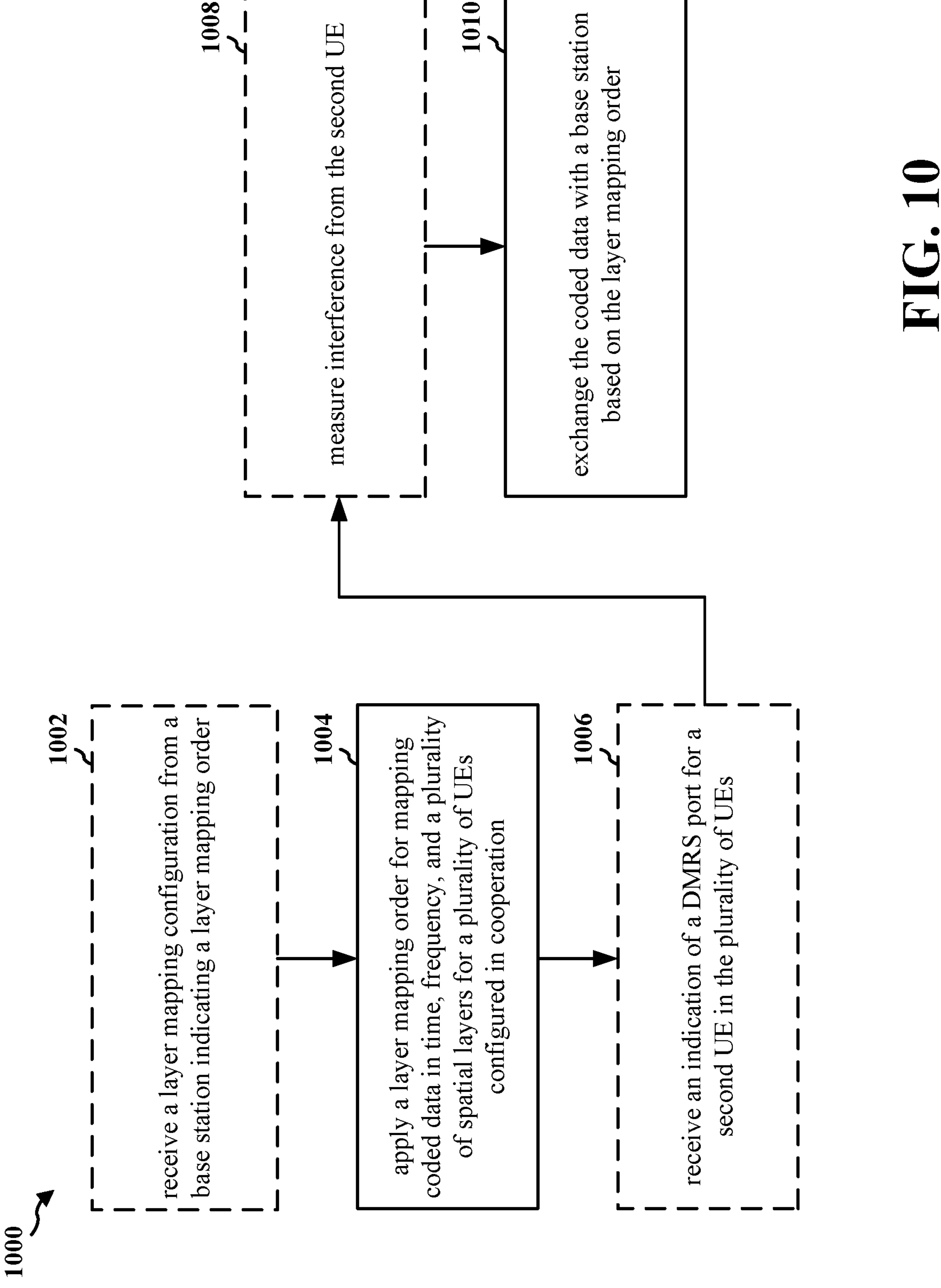
FIG. 10 is a flowchart of a method of wireless communication.

FIG. 10 is a flowchart 1000 of a method of wireless communication. The method may be performed by a UE or a component of a UE (e.g., the UE 104, 402, 702, 902; the apparatus 1102; the cellular baseband 1104, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may configure a UE to utilize a layer mapping configuration for mapping coded data.

In some aspects, for example at 1002, the UE may receive a layer mapping configuration. For example, 1002 may be performed by configuration component 1140 of apparatus 1102. The UE may receive the layer mapping configuration from a base station. The layer mapping configuration may indicate a layer mapping order.

At 1004, the UE may apply the layer mapping order. For example, 1004 may be performed by mapping component 1142 of apparatus 1102. The UE may apply the layer mapping order for mapping coded data. The layer mapping order for mapping coded data may be based in time, frequency, and a plurality of spatial layers for a plurality of UEs or a plurality of panels. The plurality of UEs or the plurality of panels may be configured in cooperation. The aspect of FIG. 10 provides an example of a UE performing the method. However, the disclosure is not intended to be limited to application for a plurality of UE(s) configured in cooperation. In some aspects, the method may be performed by a panel configured to be in cooperation with a plurality of panels. In some aspects, the layer mapping order may map the coded data to the frequency first, the time second, and the plurality of spatial layers third. Each spatial layer of the plurality of spatial layers may be associated with at least one UE of the plurality of UEs or at least one panel of the plurality of panels. Each spatial layer of the plurality of spatial layers may be associated with a respective DMRS port. In some aspects, the layer mapping order may map the coded data to the plurality of spatial layers first, the frequency second, and the time third. The layer mapping order may map to a plurality of spatial layers for a first UE in the plurality of UEs prior to mapping to the frequency and the time for the first UE followed by mapping to an additional spatial layer for a second UE in the plurality of UEs. In some aspects, each of the plurality of UEs may be associated with a codeword or a code block group. The layer mapping order may align a codeword or a code block group for a respective UE in the plurality of UEs. In some aspects, the first UE may be associated with a dedicated codeword or dedicated code block group. In some aspects, the coded data may be for a PUSCH and the coded data for the dedicated codeword or the dedicated code block group may map to each RB of an OFDM symbol for scheduled resources. In some aspects, the coded data may be for a PDSCH and the coded data for the dedicated codeword or the dedicated code block group corresponds to at least a portion of RBs of an OFDM symbol for scheduled resources.

In some aspects, for example at 1006, the UE may receive an indication of a DMRS port for a second UE in the plurality of UEs. For example, 1006 may be performed by indication component 1144 of apparatus 1102. In some aspects, the indication may be comprised in a set of DMRS CDM groups. A first CDM group may correspond to a first DMRS port for the first UE and a second CDM group may correspond to a second DMRS port for the second UE. In some aspects, the indication may be received in DCI from the base station. A first DCI may indicate a first DMRS port for the first UE and a second DCI may indicate a second DMRS port for the second UE.

In some aspects, for example at 1008, the UE may measure interference from the second UE. For example, 1008 may be performed by interference component 1146 of apparatus 1102. The UE may measure interference from the second UE by measuring the signal received at the DMRS port associated with the second UE.

At 1010, the UE may exchange the coded data with a base station. For example, 1010 may be performed by exchange component 1148 of apparatus 1102. The UE may exchange the coded data with the base station based on the layer mapping order.

Figure 11:
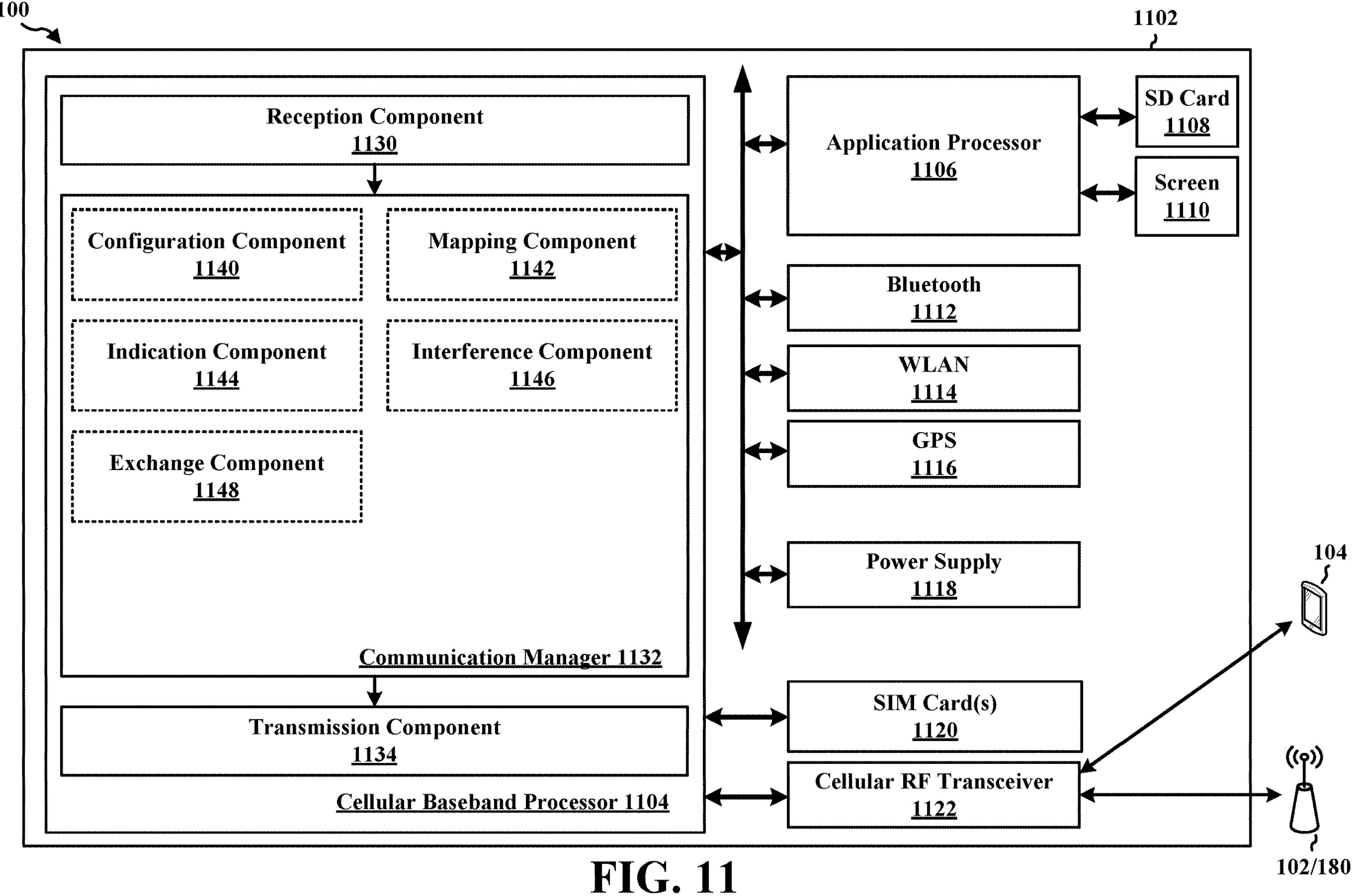
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a configuration component 1140 that is configured to receive a layer mapping configuration, e.g., as described in connection with 1002 of FIG. 10. The communication manager 1132 further includes a mapping component 1142 that is configured to apply the layer mapping order, e.g., as described in connection with 1004 of FIG. 10. The communication manager 1132 further includes an indication component 1144 that is configured to receive an indication of a DMRS port for a second UE in the plurality of UEs, e.g., as described in connection with 1006 of FIG. 10. The communication manager 1132 further includes an interference component 1146 that is configured to measure interference from the second UE, e.g., as described in connection with 1008 of FIG. 10. The communication manger 1132 further includes an exchange component 1148 that is configured to exchange the coded data with a base station, e.g., as described in connection with 1010 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for applying a layer mapping order for mapping coded data in time, frequency, and a plurality of spatial layers for a plurality of UEs configured in cooperation. The apparatus includes means for exchanging the coded data with a base station based on the layer mapping order. The apparatus further includes means for receiving a layer mapping configuration from the base station indicating the layer mapping order. The apparatus further includes means for receiving an indication of a DMRS port for a second UE in the plurality of UEs. The apparatus further includes means for measuring interference from the second UE by measuring the signal received at the DMRS port associated with the second UE. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
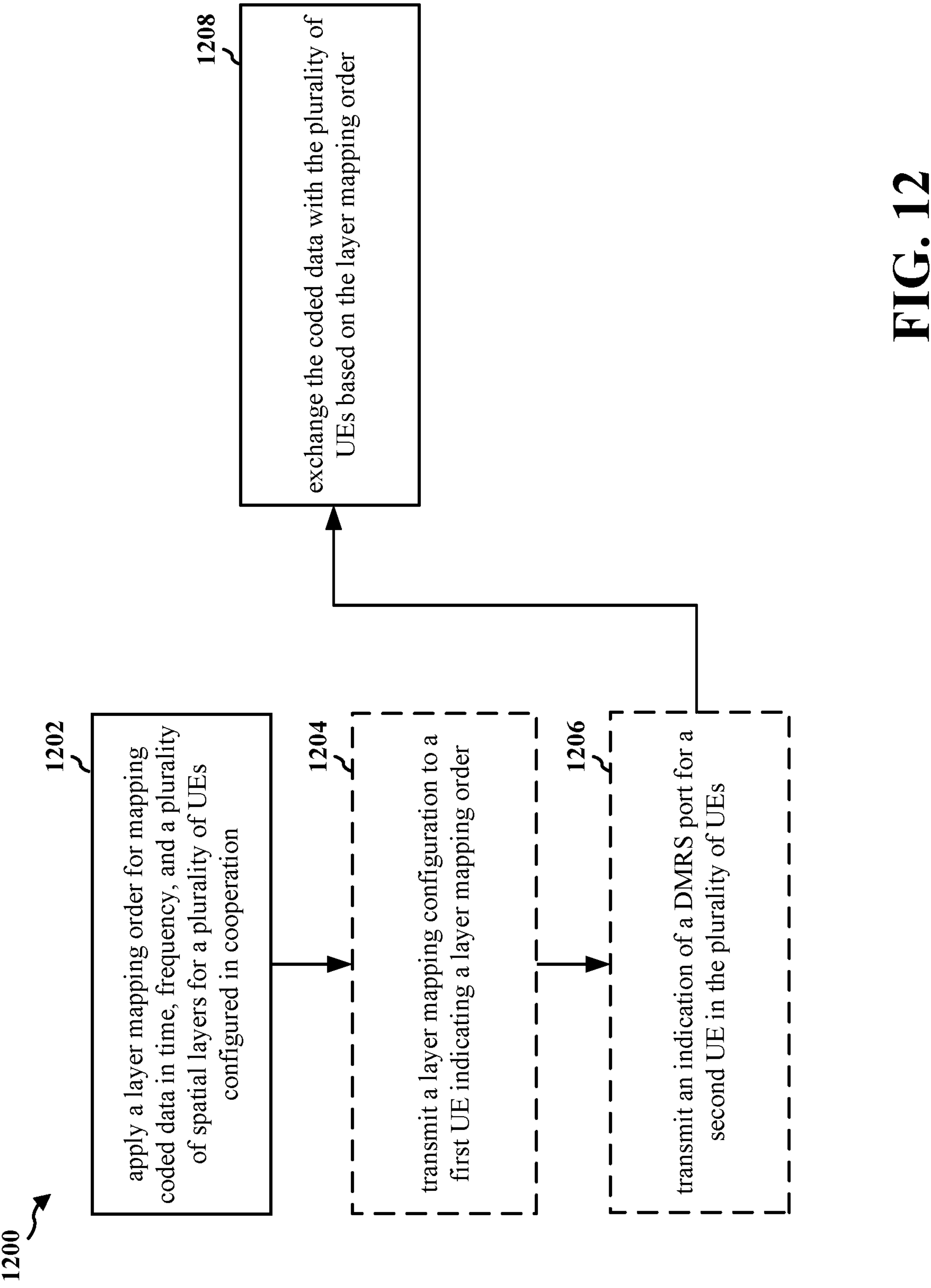
FIG. 12 is a flowchart of a method of wireless communication.

FIG. 12 is a flowchart 1200 of a method of wireless communication. The method may be performed by a base station or a component of a base station (e.g., the base station 102/180, 404, 704, 904; the apparatus 1302; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to configure a UE to utilize a layer mapping configuration for mapping coded data.

At 1202, the base station may apply a layer mapping order. For example, 1202 may be performed by mapping component 1340 of apparatus 1302. The base station may apply the layer mapping order for mapping coded data. The layer mapping order for mapping coded data may be based in time, frequency, and a plurality of spatial layer for a plurality of UEs or a plurality of panels. The plurality of UEs or the plurality of panels may be configured in cooperation. In some aspects, the layer mapping order may map the coded data to the frequency first, the time second, and the plurality of spatial layers third. Each spatial layer of the plurality of spatial layers may be associated with at least one UE of the plurality of UEs or at least one panel of the plurality of panels. Each spatial layer of the plurality of spatial layers may be associated with a respective DMRS port. In some aspects, the layer mapping order may map the coded data to the plurality of spatial layers first, the frequency second, and the time third. The layer mapping order may map to a plurality of spatial layers for a first UE in the plurality of UEs prior to mapping to the frequency and the time for the first UE followed by mapping to an additional spatial layer for a second UE in the plurality of UEs. In some aspects, each of the plurality of UEs may be associated with a codeword or a code block group. The layer mapping order may align a codeword or a code block group for a respective UE in the plurality of UEs. In some aspects, the first UE may be associated with a dedicated codeword or dedicated code block group. In some aspects, the coded data may be for a PUSCH and the coded data for the dedicated codeword or the dedicated code block group may map to each RB of an OFDM symbol for scheduled resources. In some aspects, the coded data may be for a PDSCH and the coded data for the dedicated codeword or the dedicated code block group corresponds to at least a portion of RBs of an OFDM symbol for scheduled resources.

In some aspects, for example at 1204, the base station may transmit a layer mapping configuration. For example, 1204 may be performed by configuration component 1342 of apparatus 1302. The base station may transmit the layer mapping configuration to a first UE. The layer mapping configuration may indicate the layer mapping order.

In some aspects, for example at 1206, the base station may transmit an indication of a DMRS port for a second UE in the plurality of UEs. For example, 1206 may be performed by indication component 1344 of apparatus 1302. In some aspects, the indication may be comprised in a set of DMRS CDM groups. A first CDM group may correspond to a first DMRS port for the first UE and a second CDM group may correspond to a second DMRS port for the second UE. In some aspects, the indication may be transmitted in DCI from the base station. A first DCI may indicate a first DMRS port for the first UE and a second DCI may indicate a second DMRS port for the second UE.

At 1208, the base station may exchange the coded data. For example, 1208 may be performed by exchange component 1346 of apparatus 1302. The base station may exchange the coded data with the plurality of UEs. The base station may exchange the coded data with the plurality of UEs based on the layer mapping order.

Figure 13:
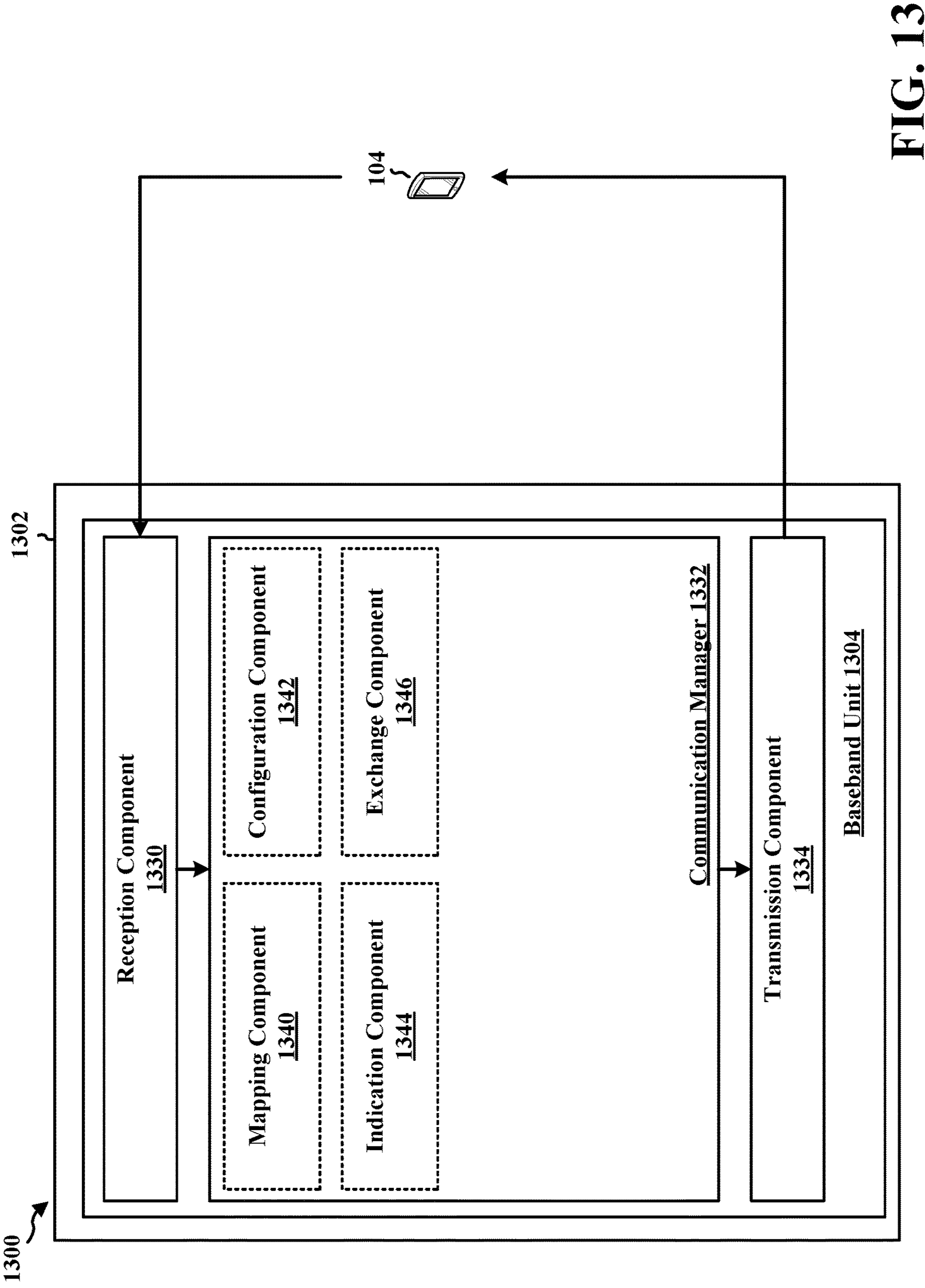
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a mapping component 1340 that is configured to apply a layer mapping order, e.g., as described in connection with 1202 of FIG. 12. The communication manager 1332 further includes a configuration component 1342 that is configured to transmit a layer mapping configuration, e.g., as described in connection with 1204 of FIG. 12. The communication manager 1332 further includes an indication component 1344 that is configured to transmit an indication of a DMRS port for a second UE in the plurality of UEs, e.g., as described in connection with 1206 of FIG. 12. The communication manager 1332 further includes an exchange component 1346 that is configured to exchange the coded data, e.g., as described in connection with 1208 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for applying a layer mapping order for mapping coded data in time, frequency, and a plurality of spatial layers for a plurality of UEs configured in cooperation. The apparatus includes means for exchanging the coded data with the plurality of UEs based on the layer mapping order. The apparatus further includes means for transmitting a layer mapping configuration to a first UE indicating the layer mapping order. The apparatus further includes means for transmitting an indication of a DMRS port for a second UE in the plurality of UEs. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a UE comprising applying a layer mapping order for mapping coded data in time, frequency, and a plurality of spatial layers for a plurality of UEs configured in cooperation or a plurality of panels configured in cooperation; and exchanging the coded data with a base station based on the layer mapping order.

In Example 2, the method of Example 1 further includes receiving a layer mapping configuration from the base station indicating the layer mapping order.

In Example 3, the method of Example 1 or 2 further includes that the layer mapping order maps the coded data to the frequency first, the time second, and the plurality of spatial layers third.

In Example 4, the method of any of Examples 1-3 further includes that each spatial layer of the plurality of spatial layers is associated with at least one UE of the plurality of UEs or at least one panel of the plurality of panels.

In Example 5, the method of any of Examples 1-4 further includes that each spatial layer of the plurality of spatial layers is associated with a respective DMRS port.

In Example 6, the method of any of Examples 1-5 further includes that the layer mapping order maps the coded data to the plurality of spatial layers first, the frequency second, and the time third.

In Example 7, the method of any of Examples 1-6 further includes that the layer mapping order maps to a plurality of spatial layers for a first UE in the plurality of UEs prior to mapping to the frequency and the time for the first UE followed by mapping to an additional spatial layer for a second UE in the plurality of UEs.

In Example 8, the method of any of Examples 1-7 further includes receiving an indication of a DMRS port for a second UE in the plurality of UEs; and measuring interference from the second UE by measuring the signal received at the DMRS port associated with the second UE.

In Example 9, the method of any of Examples 1-8 further includes that the indication is comprised in a set of DMRS CDM groups, wherein a first CDM group corresponds to a first DMRS port for the first UE and a second CDM group corresponds to a second DMRS port for the second UE.

In Example 10, the method of any of Examples 1-9 further includes that the indication is received in DCI from the base station wherein a first DCI indicates a first DMRS port for the first UE and a second DCI indicates a second DMRS port for the second UE.

In Example 11, the method of any of Examples 1-10 further includes that each of the plurality of UEs is associated with a codeword or a code block group, and wherein the layer mapping order aligns a codeword or a code block group for a respective UE in the plurality of UEs.

In Example 12, the method of any of Examples 1-11 further includes that the first UE is associated with a dedicated codeword or dedicated code block group.

In Example 13, the method of any of Examples 1-12 further includes that the coded data is for a PUSCH and the coded data for the dedicated codeword or the dedicated code block group maps to each RB of an OFDM symbol for scheduled resources.

In Example 14, the method of any of Examples 1-13 further includes that the coded data is for a PDSCH and the coded data for the dedicated codeword or the dedicated code block group corresponds to at least a portion of RBs of an OFDM symbol for scheduled resources.

Example 15 is a device including one or more processors and one or more memories in electronic communication with the one or more processors storing instructions executable by the one or more processors to cause the system or apparatus to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a base station comprising applying a layer mapping order for mapping coded data in time, frequency, and a plurality of spatial layers for a plurality of UEs configured in cooperation or a plurality of panels configured in cooperation; and exchanging the coded data with the plurality of UEs based on the layer mapping order.

In Example 19, the method of Example 18 further includes transmitting a layer mapping configuration to a first UE indicating the layer mapping order.

In Example 20, the method of Example 18 or 19 further includes that the layer mapping order maps the coded data to the frequency first, the time second, and the plurality of spatial layers third.

In Example 21, the method of any of Examples 18-20 further includes that each spatial layer of the plurality of spatial layers is associated with at least one UE of the plurality of UEs or at least one panel of the plurality of panels.

In Example 22, the method of any of Examples 18-21 further includes that each spatial layer of the plurality of spatial layers is associated with a respective DMRS port.

In Example 23, the method of any of Examples 18-22 further includes that the layer mapping order maps the coded data to the plurality of spatial layers first, the frequency second, and the time third.

In Example 24, the method of any of Examples 18-23 further includes that the layer mapping order maps to a plurality of spatial layers for a first UE in the plurality of UEs prior to mapping to the frequency and the time for the first UE followed by mapping to an additional spatial layer for a second UE in the plurality of UEs.

In Example 25, the method of any of Examples 18-24 further includes transmitting an indication of a DMRS port for a second UE in the plurality of UEs.

In Example 26, the method of any of Examples 18-25 further includes that the indication is comprised in a set of DMRS CDM groups, wherein a first CDM group corresponds to a first DMRS port for the first UE and a second CDM group corresponds to a second DMRS port for the second UE.

In Example 27, the method of any of Examples 18-26 further includes that the indication is transmitted in DCI from the base station, wherein a first DCI indicates a first DMRS port for the first UE and a second DCI indicates a second DMRS port for the second UE.

In Example 28, the method of any of Examples 18-27 further includes that each of the plurality of UEs is associated with a codeword or a code block group, and wherein the layer mapping order aligns a codeword or a code block group for a respective UE in the plurality of UEs.

In Example 29, the method of any of Examples 18-28 further includes that the first UE is associated with a dedicated codeword or dedicated code block group.

In Example 30, the method of any of Examples 18-29 further includes that the coded data is for a PUSCH and the coded data for the dedicated codeword or the dedicated code block group maps to each RB of an OFDM symbol for scheduled resources.

In Example 31, the method of any of Examples 18-30 further includes that the coded data is for a PDSCH and the coded data for the dedicated codeword or the dedicated code block group corresponds to at least a portion of RBs of an OFDM symbol for scheduled resources.

Example 32 is a device including one or more processors and one or more memories in electronic communication with the one or more processors storing instructions executable by the one or more processors to cause the system or apparatus to implement a method as in any of Examples 18-31.

Example 33 is a system or apparatus including means for implementing a method or realizing an apparatus as in any of Examples 18-31.

Example 34 is a non-transitory computer readable medium storing instructions executable by one or more processors to cause the one or more processors to implement a method as in any of Examples 18-31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:

receiving, from a base station, a layer mapping configuration that indicates a layer mapping order for mapping coded data in time, frequency, and a plurality of spatial layers associated with a plurality of separate panels, wherein each spatial layer of the plurality of spatial layers is associated with a respective UE of a plurality of UEs or a respective panel of the plurality of separate panels, wherein the layer mapping order maps the coded data to the frequency first, the time second, and the plurality of spatial layers third;

applying the layer mapping order for the mapping; and exchanging the coded data with the base station based on the layer mapping order.

2. The method of claim 1, wherein each spatial layer of the plurality of spatial layers is associated with at least one UE of a plurality of UEs or at least one panel of the plurality of separate panels.

3. The method of claim 1, wherein each spatial layer of the plurality of spatial layers is associated with a respective demodulation reference signal (DMRS) port.

4. The method of claim 1, wherein the layer mapping order maps the coded data to the plurality of spatial layers first, the frequency second, and the time third.

5. The method of claim 4, wherein the layer mapping order maps to the plurality of spatial layers for a first UE in a plurality of UEs prior to mapping to the frequency and the time for the first UE followed by mapping to an additional spatial layer for a second UE in the plurality of UEs.

6. The method of claim 1, further comprising:

receiving an indication of a demodulation reference signal (DMRS) port for a second UE in a plurality of UEs, wherein the plurality of separate panels is associated with the plurality of UEs; and measuring interference from the second UE by measuring the signal received at the DMRS port associated with the second UE.

7. The method of claim 6, wherein the indication is comprised in a set of DMRS code division multiplex (CDM) groups, wherein a first CDM group corresponds to a first DMRS port for the first UE and a second CDM group corresponds to a second DMRS port for the second UE.

8. The method of claim 7, wherein the indication is received in downlink control information (DCI) from the base station wherein a first DCI indicates a first DMRS port for the first UE and a second DCI indicates a second DMRS port for the second UE.

9. The method of claim 1, wherein the plurality of separate panels is associated with a plurality of UEs, each of the plurality of UEs is associated with a codeword or a code block group, and wherein the layer mapping order aligns a codeword or a code block group for a respective UE in the plurality of UEs.

10. The method of claim 9, wherein a first UE of the plurality of UEs is associated with a dedicated codeword or a dedicated code block group.

11. The method of claim 10, wherein the coded data is for a physical uplink shared channel (PUSCH) and the coded data for the dedicated codeword or the dedicated code block group maps to each RB of an orthogonal frequency division multiplexing (OFDM) symbol for scheduled resources.

12. The method of claim 10, wherein the coded data is for a physical downlink shared channel (PDSCH) and the coded data for the dedicated codeword or the dedicated code block group corresponds to at least a portion of RBs of an OFDM symbol for scheduled resources.

13. An apparatus for wireless communication at a user equipment (UE), comprising:

means for receiving from a base station a layer mapping configuration that indicates a layer mapping order for mapping coded data in time, frequency, and a plurality of spatial layers associated with a plurality of separate panels, wherein each spatial layer of the plurality of spatial layers is associated with a respective UE of a plurality of UEs or a respective panel of the plurality of separate panels, wherein the layer mapping order maps the coded data to the frequency first, the time second, and the plurality of spatial layers third;

means for applying the layer mapping order for the mapping; and means for exchanging the coded data with the base station based on the layer mapping order.

14. A method of wireless communication at a base station, comprising:

configuring a layer mapping configuration indicating a layer mapping order for mapping coded data in time, frequency, and a plurality of spatial layers associated with a plurality of separate panels, wherein each spatial layer of the plurality of spatial layers is associated with a respective UE of a plurality of UEs or a respective panel of the plurality of separate panels, wherein the layer mapping order maps the coded data to the frequency first, the time second, and the plurality of spatial layers third;

applying the layer mapping order for the mapping; and exchanging the coded data with the plurality of separate panels based on the layer mapping order.

15. The method of claim 14, further comprising:

transmitting a layer mapping configuration to a first UE indicating the layer mapping order.

16. The method of claim 14, wherein each spatial layer of the plurality of spatial layers is associated with at least one UE of a plurality of UEs or at least one panel of the plurality of separate panels.

17. The method of claim 14, wherein each spatial layer of the plurality of spatial layers is associated with a respective demodulation reference signal (DMRS) port.

18. The method of claim 14, wherein the layer mapping order maps the coded data to the plurality of spatial layers first, the frequency second, and the time third.

19. The method of claim 18, wherein the layer mapping order maps to the plurality of spatial layers for a first UE in a plurality of UEs prior to mapping to the frequency and the time for the first UE followed by mapping to an additional spatial layer for a second UE in the plurality of UEs.

20. The method of claim 14, wherein the plurality of separate panels is associated with a plurality of UEs, and the method further comprises:

transmitting an indication of a demodulation reference signal (DMRS) port for a second UE in the plurality of UEs.

21. The method of claim 20, wherein the indication is comprised in a set of DMRS code division multiplex (CDM) groups, wherein a first CDM group corresponds to a first DMRS port for a first UE and a second CDM group corresponds to a second DMRS port for the second UE.

22. The method of claim 21, wherein the indication is transmitted in downlink control information (DCI) from the base station, wherein a first DCI indicates a first DMRS port for the first UE and a second DCI indicates a second DMRS port for the second UE.

23. The method of claim 14, wherein the plurality of separate panels is associated with a plurality of UEs, each of the plurality of UEs is associated with a codeword or a code block group, and wherein the layer mapping order aligns a codeword or a code block group for a respective UE in the plurality of UEs.

24. The method of claim 23, wherein a first UE is associated with a dedicated codeword or a dedicated code block group.

25. The method of claim 24, wherein the coded data is for a physical uplink shared channel (PUSCH) and the coded data for the dedicated codeword or the dedicated code block group maps to each RB of an OFDM symbol for scheduled resources.

26. The method of claim 24, wherein the coded data is for a physical downlink shared channel (PDSCH) and the coded data for the dedicated codeword or the dedicated code block group corresponds to at least a portion of RBs of an OFDM symbol for scheduled resources.

27. An apparatus for wireless communication at a base station, comprising:

means for configuring a layer mapping configuration indicating a layer mapping order for mapping coded data in time, frequency, and a plurality of spatial layers associated with a plurality of separate panels, wherein each spatial layer of the plurality of spatial layers is associated with a respective UE of a plurality of UEs or a respective panel of the plurality of separate panels, wherein the layer mapping order maps the coded data to the frequency first, the time second, and the plurality of spatial layers third;

means for applying the layer mapping order for the mapping; and means for exchanging the coded data with the plurality of separate panels based on the layer mapping order.

* * * * *